US012286242B2

(12) United States Patent
Wyler et al.

(10) Patent No.: US 12,286,242 B2
(45) Date of Patent: Apr. 29, 2025

(54) MAGNETIC CONTROL OF SPACECRAFT

(71) Applicant: WildStar, LLC, Hanover, NH (US)

(72) Inventors: Gregory Thane Wyler, Stuart, FL (US); Bobby Glenn Holden, Somerville, MA (US); Manwei Chan, Cambridge, MA (US)

(73) Assignee: WildStar, LLC, Hanover, NH (US)

( * ) Notice: Subject to any disclaimer, the term of this patent is extended or adjusted under 35 U.S.C. 154(b) by 241 days.

(21) Appl. No.: 17/948,730

(22) Filed: Sep. 20, 2022

(65) Prior Publication Data

US 2023/0093514 A1 Mar. 23, 2023

Related U.S. Application Data

(60) Provisional application No. 63/246,175, filed on Sep. 20, 2021.

(51) Int. Cl.
    B64G 1/32    (2006.01)
    B64G 1/10    (2006.01)
    B64G 1/24    (2006.01)
    B64G 1/36    (2006.01)
(52) U.S. Cl.
    CPC ........... B64G 1/366 (2013.01); B64G 1/1085 (2013.01); B64G 1/244 (2019.05); B64G 1/245 (2023.08); B64G 1/32 (2013.01)
(58) Field of Classification Search
    CPC ........ B64G 1/366; B64G 1/32; B64G 1/1085; B64G 1/244; B64G 1/242; B64G 1/245
    See application file for complete search history.

(56) References Cited

U.S. PATENT DOCUMENTS

| 3,061,239 A | 10/1962 | Rusk |
| 4,732,353 A * | 3/1988 | Studer ............... H02K 7/09 244/165 |
| 5,992,799 A * | 11/1999 | Gamble ............ B64G 1/26 244/164 |

(Continued)

FOREIGN PATENT DOCUMENTS

| EP | 1357451 | 10/2003 |
| FR | 2809502 | 11/2001 |
| RU | 2767648 C1 * | 3/2022 |

OTHER PUBLICATIONS

RU 2767648 C1—machine translation (Year: 2022).*

(Continued)

Primary Examiner — Dino Kujundzic
(74) Attorney, Agent, or Firm — Erin P. Madill

(57) ABSTRACT

A method for controlling a satellite using magnetics only, and a control system for implementing the method. The method involves assessing a current attitude of a satellite at a current time and location using magnetometry; setting a desired attitude for the satellite at a future time in a future location; developing a set of waypoints that provide the attitude of the satellite at plural locations between the current location and the future location; and actuating a plurality of magnetorquers to induce torques that achieve a small as possible difference between the attitude of the satellite between each waypoint and achieving the desired attitude at the future location, the magnetorquers being the sole means of inducing rotation of the satellite to attain the desired attitude.

17 Claims, 6 Drawing Sheets

(56) References Cited

U.S. PATENT DOCUMENTS

| | | | | |
|---|---|---|---|---|
| 6,089,510 | A * | 7/2000 | Villani | B64G 1/32 |
| | | | | 244/166 |
| 7,376,496 | B1 | 5/2008 | Weigl et al. | |
| 9,365,301 | B2 * | 6/2016 | Moro | B64G 1/32 |
| 2002/0020785 | A1 * | 2/2002 | Eyerly | B64G 1/242 |
| | | | | 244/164 |
| 2003/0098394 | A1 * | 5/2003 | Cooper | B64G 1/366 |
| | | | | 244/166 |
| 2020/0377236 | A1 | 12/2020 | Lemke et al. | |
| 2022/0402633 | A1 * | 12/2022 | Kitamura | B64G 1/363 |

OTHER PUBLICATIONS

Authorized Officer Carlos Weber, International Search Report and Written Opinion mailed on Jan. 18, 2023 issued in PCT Patent Application No. PCT/US2022/044122.

Ovchinnikov M. Yu et al., A survey on active magnetic attitude control algorithms for small satellites, Jan. 6, 2019, Progress in Aerospace Sciences, Oxford, GB, XP085772869, vol. 109.

* cited by examiner

MAGNETIC CONTROL OF SPACECRAFT

STATEMENT OF RELATED CASES

This case claims priority of U.S. Patent Appl. Ser. 63/246,175, filed Sep. 20, 2021, which is incorporated herein by reference.

FIELD OF THE INVENTION

The present invention relates to spacecraft, such as satellites, and methods and apparatus for controlling satellites.

BACKGROUND OF THE INVENTION

Satellites with precision stability and pointing requirements have historically required sophisticated guidance and control systems, which rely primarily on reaction wheels, control-moment gyros, or thrusters. The reaction (or momentum) wheel ("RW") and control-moment gyro ("CMG")-based control systems have a spinning mass (i.e., a flywheel), and rely on conservation of angular momentum to re-direct the pointing of the satellite. Accelerating or reorienting the flywheel within a RW or CMG, respectively, changes the angular momentum of the RW or CMG. This change in angular momentum generates a rotation in the spacecraft, which moves to counteract the change in angular momentum produced by the RW or CMG. By actuating a RW/CMG in each axis, three-axis control is achieved. Larger and faster wheels store more momentum, enabling higher precision and rates of rotation.

Augmenting these flywheel-based actuators is often some form of magnetic control that relies on the Earth's magnetic field to coarsely apply forces to the satellite to support the primary systems. Magnetic actuators—so called "magnetorquers"— built from electromagnets that can be actuated or modulated at will, generate a controllable local magnetic field that attempts to align with Earth's natural magnetic field, yielding a torque to induce body rotation. Magnetorquers have not been used for primary pointing methods in communications or optical satellites where precision control is required. Rather, they are used for secondary purposes such as tip-off detumbling (which does not require a precise final orientation), or reaction-wheel desaturation (to offload excess momentum from the RW into the Earth's magnetic field), or only when very coarse pointing or detumbling is required.

Although effective, reaction wheels and control-moment gyros are one of the most failure prone satellite elements. They are sophisticated electro-mechanical systems; the discs contained within spin at speeds up to about 10,000 rpm, and must maintain lubrication in the vacuum of space. They have microprocessors, which are subject to radiation issues, and include motors that also have moving parts, such as bearings, which often fail in the vacuum and continuous temperature gradients of space.

Consequently, satellites often include at least one extra reaction wheel for a total of four reaction wheels in order to have a level of redundancy. Even with redundancy, inevitable failures of individual actuators ultimately reduce control authority, which leads to loss of control of the satellite. Thrusters, which are typically used for large systems having volume that can be dedicated to compressed gas storage, have a system lifetime that is constrained by the depletion rate of the stored gas. Thrusters are thus unsuitable for prolonged continuous guidance-control use.

In short, reaction wheels have one of the highest failure rates of all components on satellites, they add mass to the satellite, and consume power and increase cost. The art would therefore benefit from improvements in guidance and control.

SUMMARY

Embodiments of the invention provide a way to improve the pointing accuracy of a satellite that avoids some of the costs and disadvantages of the prior art. In accordance with some embodiments of the invention, magnetics alone is used for accurately pointing a satellite.

An advantage of magnetic-only control of a satellite is that it requires no moving parts. It will have higher reliability, lower mass, and subsequently lower costs than the approaches discussed above. This lifts constraints on the form factor of a satellite, enabling designs that are optimized for mission specifics, rather than accommodating the bulky reaction wheels.

In some embodiments, the invention provides a method for controlling a first satellite using magnetics alone, the method comprising: (a) assessing a current attitude of the first satellite at a current time and at a current location using magnetometry; (b) setting a desired attitude for the first satellite at a future time in a future location; (c) developing a set of waypoints for the first satellite, wherein the waypoints provide the attitude of the first satellite at plural locations between the current location and the future location, wherein the waypoints are based on a model of the Earth's magnetic field, wherein the model provides the state of the magnetic field at each waypoint; and (d) actuating a plurality of magnetorquers to induce torques that achieve a small as possible difference between the attitude of the first satellite between each waypoint and achieving the desired attitude at the future location, and wherein the magnetorquers are the sole means of inducing rotation of the first satellite to attain the desired attitude.

In some further embodiments, the invention provides an apparatus comprising a control system for a satellite, wherein the control system uses magnetics only to control an attitude of the satellite, wherein the control system comprises: actuators that actuate a plurality of magnetorquers; memory that stores 3-axis magnetometer data and data based thereon; a processor, wherein the processor: (a) develops a set of waypoints for the satellite, wherein the waypoints provide an attitude of the satellite at plural locations between the current location at a current time and a future location at a future time, wherein the waypoints are based on a model of the Earth's magnetic field and an ability to use the plurality of magnetorquers to attain the attitude at each of the plural locations; and (b) sends signals that cause the actuators to actuate the plurality of magnetorquers to induce torques during a time period beginning with the current time and ending at the future time when the desired attitude is attained, wherein the magnetorquers are the sole means of inducing rotation of the satellite to attain the desired attitude.

DETAILED DESCRIPTION

The following description illustrates the principles of the disclosure. It will thus be appreciated that those skilled in the art will be able to devise various arrangements which, although not explicitly described or shown herein, embody the principles of the disclosure, and are included within its spirit and scope. More particularly, while numerous specific details are set forth, it is understood that embodiments of the disclosure may be practiced without these specific details and in other instances, well-known circuits, structures, and techniques have not been shown in order not to obscure the understanding of the disclosure.

Furthermore, all examples and conditional language recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future; that is, any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof, any element expressed as a means for performing a specified function is intended to encompass any way of performing that function including, for example, a) a combination of circuit elements which performs that function or b) software in any form, including, therefore, firmware, microcode, or the like, combined with appropriate circuitry for executing that software to perform the function.

The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Figure 1A:
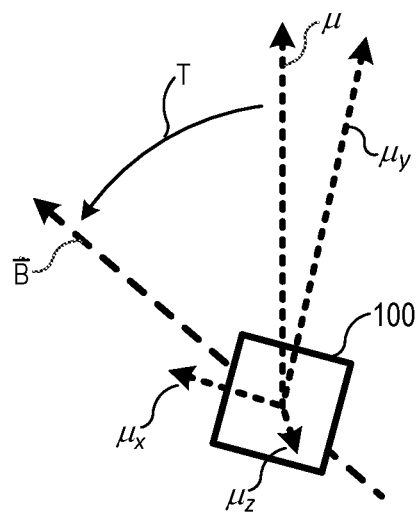
FIG. 1A depicts an illustration of the torque created against the Earth's magnetic field by a total magnetic moment ($\mu$) of a spacecraft.
Figure 1B:
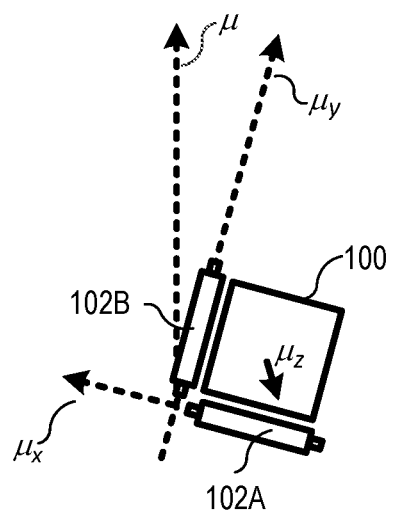
FIG. 1B depicts per-axis contributions of magnetorquers (of varying type) forming a total magnetic moment ($\mu$) of arbitrary desired vector from their contributed components ($\mu x$, $\mu Y$, $\mu z$).

FIG. 1A provides an illustration of the torque T created against the Earth's magnetic field by a total magnetic moment p of spacecraft 100. FIG. 1B depicts per-axis contributions of magnetorquers 102A and 102B (of varying type) forming a total magnetic moment μ of arbitrary desired vector from their contributed components $\mu z$, $\mu y$, and $\mu z$.

Historically, there have been insurmountable challenges to achieve reasonable pointing accuracy with a magnetics-only pointing system. In particular, and among any other issues:

The reference magnetic-field models are low resolution, and large local inaccuracies are to be expected.

The magnetosphere itself is constantly and rapidly changing due to solar and atmospheric effects.

Satellites generate substantial magnetic disturbances in the course of operation, whereas the magnetically generated torques are relatively weak.

Magnetic torques can only be applied in planes orthogonal to the magnetic field at any given point, but may not induce rotation around the vector of the magnetic field.

These shortcomings challenges, among any others, have prevented other systems from using a magnetics-only actuation system. Embodiments of the present invention incorporate the ability to model the magnetic environment of a satellite, record its actual magnetic environment, and to correct the model, in order to account for these limitations and complexities in the course of the magnetic control.

Figure 2:
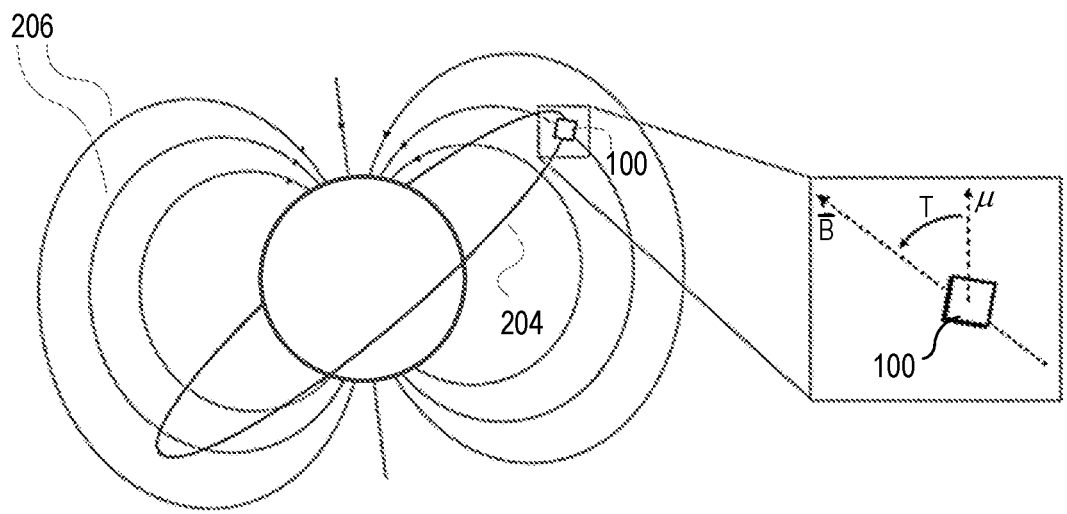
FIG. 2 depicts the application of spacecraft magnetic moment to create controllable torque within the Earth's magnetic field.

FIG. 2 depicts the application of spacecraft magnetic moment p to create controllable torque T within Earth's spatially and temporally varying magnetic field 206.

Satellites, such as satellite 100, typically move about ring 204 within a "plane," wherein in a constellation of such satellites, there are multiple planes of satellites. The plural satellites within each plane are arranged around the ring and follow one another in orbits, with the Earth at their center.

Figure 3:
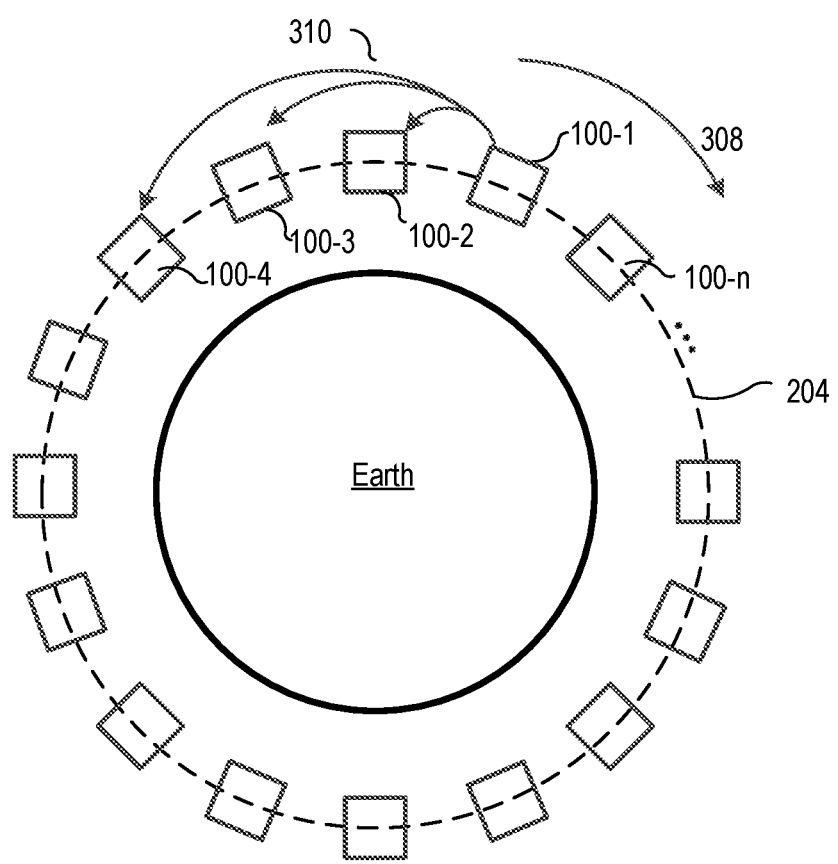
FIG. 3 depicts the collection of local orbital magnetosphere data from the leading satellites in a plane, and the transmission of such data to the satellites that follow, in accordance with the present teachings.

In accordance with the illustrative embodiment, and as depicted in FIG. 3, local orbital magnetosphere data 310 collected from the leading satellite (e.g., satellite 100-1, etc.) in the plane is used to inform the control systems of the satellites (e.g., satellites 100-2, 100-3, and 100-4, etc.) that follow it. More particularly, the data obtained is used to refine the magnetic model, which is then used with trajectory planning & control systems in accordance with present teachings. When there are many satellites in a constellation, and when the satellites are designed with appropriately large and appropriately high resolution magnetic-sensing mechanisms, a detailed and real-time (i.e., continually updated) model of the magnetosphere can be developed using measurements from the leading satellites. As the satellites advance in the orbital direction 308, and the next satellite (i.e., satellite 100-2) becomes the leading satellite, updated local orbital magnetosphere data 310 is collected from the then leading satellite, which then informs the control systems of the following satellites.

Figure 4:
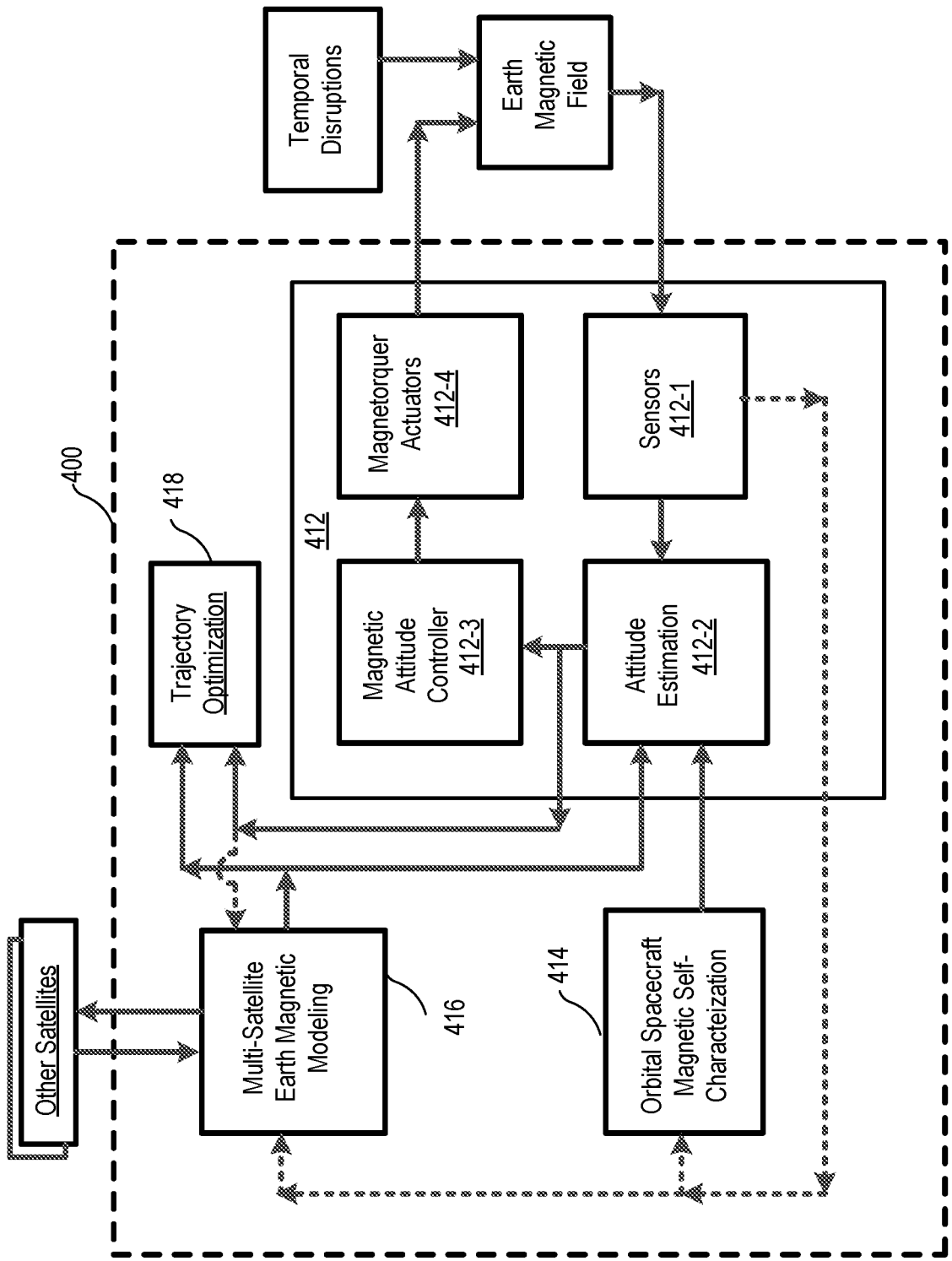
FIG. 4 depicts an embodiment of a magnetic control system in accordance with the present teachings.

FIG. 4 depicts an embodiment of magnetic control system 400 in accordance with the present teachings. Magnetic control system 400 includes basic (conventional) magnetic control system 412, as is well known in the art, and additional modules unique to embodiments of the invention. The latter modules include orbital spacecraft magnetic selfcharacterization module 414, multi-satellite Earth magnetic modeling module 416, and trajectory optimization module 418.

Figure 7:
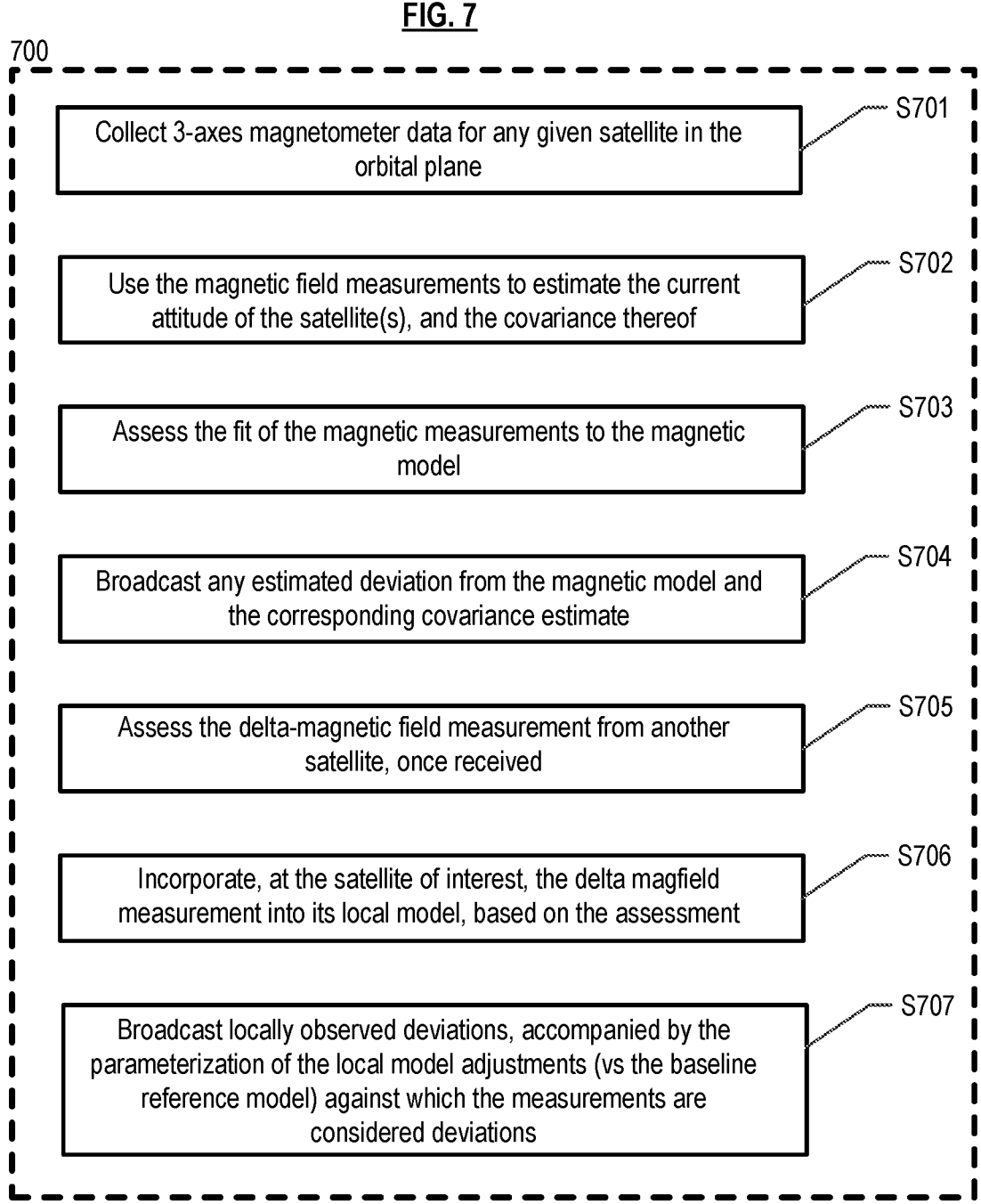
FIG. 7 depicts a method for magnetic-model refinement for use in conjunction with the trajectory optimization method of FIG. 6.
Figure 8:
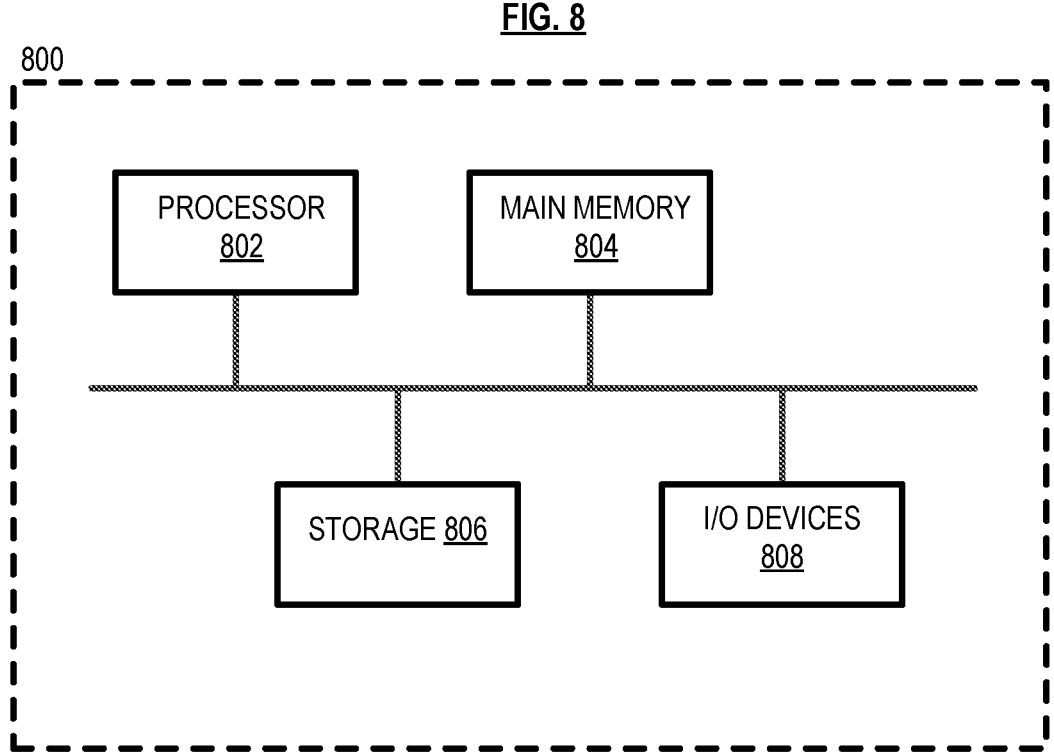
FIG. 8 depicts a block diagram of an illustrative data processing system for use in conjunction with embodiments of the invention.

Magnetic control system 400 includes a data processing system, which is not explicitly depicted in FIG. 4; see FIG. 8: data processing system 800. The data processing system stores specialized software, and receives data (e.g., from on-board sensors, from other satellites, etc.), and processes data using the specialized software. In magnetic control system 400, modules 414, 416, and 418 are examples of such specialized software, as well as some modules of basic magnetic control system 412, such as, for example, attitude estimation 412-2 and magnetic attitude controller 412-3. Magnetic control system 400 also includes sensors 412-1 (i.e., for sensing the Earth's magnetic field) and actuators 412-4 for magnetorquers. The magnetorquer actuators include both software (i.e., drivers), as well as an electromechanical actuation system. Basic magnetic control system 412 also include magnetorquers, which are not depicted. The design and operation basic magnetic control system 412 is known to those skilled in the art. Magnetic control system 400 is described in further detail in conjunction with FIGS. 5-7.

Figure 5:
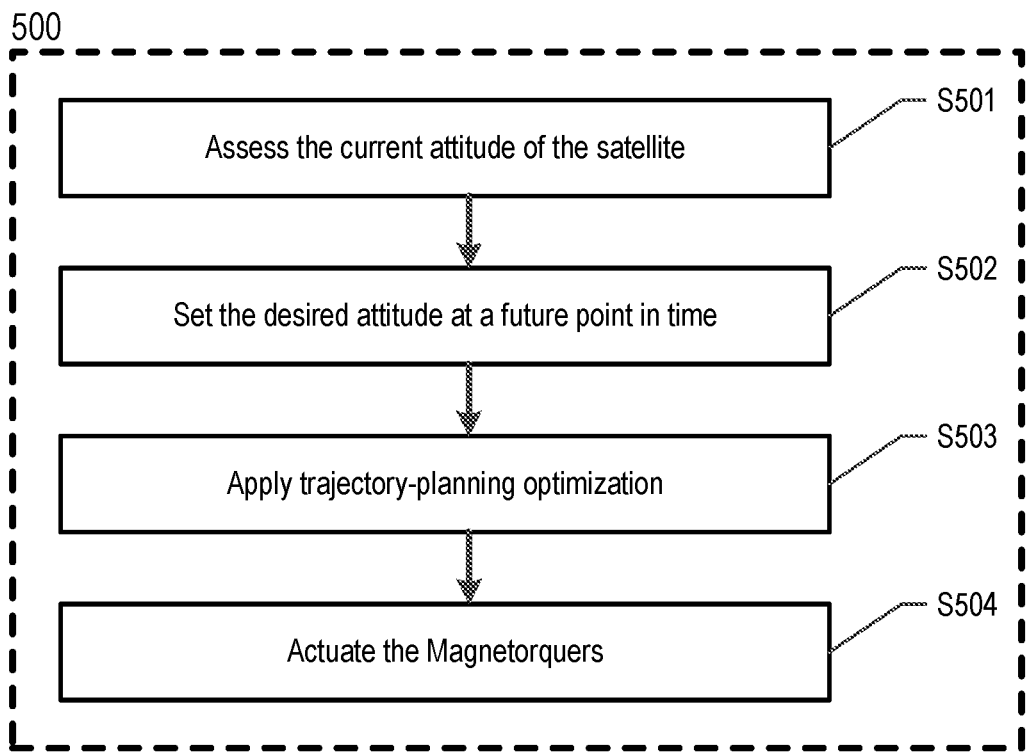
FIG. 5 depicts an embodiment of a method for precision attitude control with magnetic modelling and sensing in accordance with the present teachings.

FIG. 5 depicts an embodiment of a method for precision attitude control with accurate magnetic modelling and sensing in accordance with the present teachings. The method depicted in FIG. 5 is a basic implementation of this technology; in light of this disclosure, it will be within the capabilities of those skilled in the art to include any of a variety of optional modifications to the inventive technique.

Referring now to the method of FIG. 5, in task S501, the current attitude (i.e., the orientation and rate-of-rotation of the satellite) is assessed. This can be performed by, for example and without limitation, magnetometry (see FIG. 4, attitude estimate 412-2).

In task S502, a desired attitude of the satellite at a future point in time is set. The desired future attitude (i.e., where the satellite will be pointing at an appointed time) can be set by: (i) mission specifics, (ii) autonomously based sensor readings, or (iii) manually by an operator. Full pointing authority (i.e., the ability to reorient the satellite arbitrarily) can be achieved given enough time (and therefore enough magnetic-field variation) to circumvent the underactuated control limitations inherent in magnetic-only attitude control.

In this regard, consider that magnetic-only control cannot induce torque "around" the Earth's magnetic field at any given point—only against it. So, conventional magnetic control can only cause pivots around the two axes that are orthogonal to the Earth's magnetic field, but not around the third axis that aligns with the magnetic field. However, since the Earth's magnetic field is constantly changing orientation relative to the satellite, over time, all axes are available to induce torque. In accordance with the illustrative embodiment, magnetic control system 400 works within those restrictions to achieve arbitrary rotations, as required to implement a desired future satellite attitude.

In task S503, a trajectory-planning optimization method, implemented by trajectory optimization module 418, is applied to develop: (a) a set of waypoints (i.e., orientation+ rotation-rate at each time point) between the current and final attitude, and (b) control signals to apply to the magnetorquers to follow the waypoints. And in task S504, during the time period for which the waypoints were calculated, the magnetorquers of basic magnetic control system 412 are actuated to induce torques that minimize the state-delta between the current attitude and prescribed waypoints of the designed trajectory. In conjunction with this task, closed-loop tracking control can be used to correct deviations from the planned trajectory while the satellite is en-route.

Figure 6:
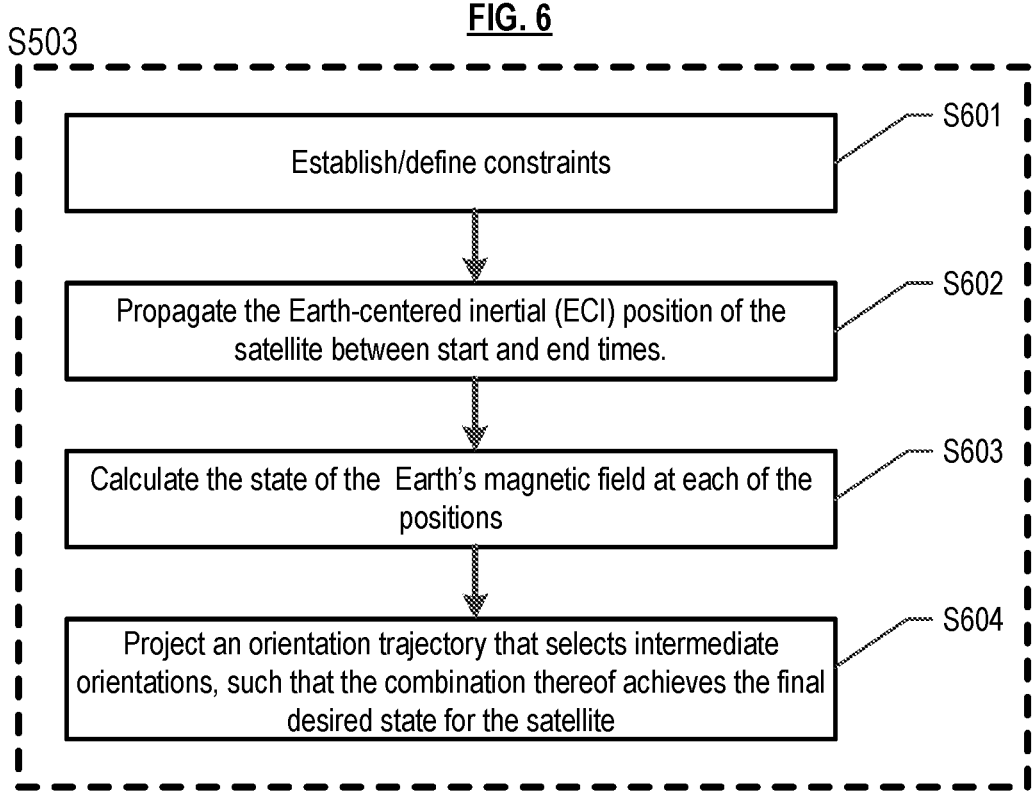
FIG. 6 depicts an optimization method for use in conjunction with the method of FIG. 5.

A variety of optimization models and approaches can be used to implement task S503. A non-limiting example of one such method is depicted in FIG. 6, which is performed via trajectory optimization module (i.e., software) 418.

In task S601, constraints are established, such as: (i) the start (i.e., current state) and (ii) end (final desired state) of the satellite ("state" being the orientation and its rate of change—actual and desired limits throughout— of components of spin), and (iii) orbital parameters of the satellite. In task S602, the Earth-centered inertial (ECI) position of the satellite is propagated between the start and end times. As known to those skilled in the art, "ECI" is a way of describing position that is not dependent on the current rotation of the Earth (inertial). Relative positions above the Earth's surface points, when combined with a particular time, can be converted to this absolute position reference. Thus, in task S602 the progression of ECI position, at one time to where it will be in the future (from start to finish), is simulated via the application of standard orbital dynamics models.

In task S603, the state of the Earth Magnetic Field is calculated for each ECI position in task S602. This task is performed (via module 418) using data obtained from multi-satellite Earth magnetic-modeling module 416. And in task S604, an orientation trajectory is projected that selects intermediate orientations in the temporally changing magnetic environment, wherein such orientations are incrementally reachable via the available underactuated magnetic control from the current (or prior intermediary) step, such that the combination of intermediate steps (i.e., satellite orientations) makes the final desired state accessible. The intermediate orientations (at a particular time/place along the orbit) can be selected by means of brute-force analysis, an optimization engine, or progressive heuristics. The analysis, optimization engine, or heuristics can each leverage heuristics to tune behavior to the desire of the operators of the particular system.

A non-limiting example of a method for magnetic model refinement for use during trajectory optimization is depicted in FIG. 7. Per task S701, at any given satellite in an orbital plane of satellites, three-axis magnetometer measurements are collected at regular intervals that are at least twice as frequent as the control signals are to be updated.

In task S702, the magnetic field measurements from the magnetometers, and measurements from any other attitude sensors that are available (e.g., coarse and fine sun sensors, earth horizon/limb sensors, feedback from payloads, etc.) are used to estimate current attitude, and the covariance thereof. In some embodiments, each satellite that obtains magnetometer data performs this task.

In task S703, the 'fit' of the magnetic measurements to the receiving satellites' magnetic model is assessed at the time and location of the collected measurement/corresponding attitude estimate (i.e., thus each satellite that obtains magnetometer data performs this task). Deviations from each measuring satellite's local model are distributed, such as via a network or link, to other satellites in the orbital plane. In task 704, the estimated deviation from the magnetic model and corresponding covariance estimate (along the trajectory of the source satellite) is broadcast to one or more satellites in the network.

Per task S705, at any given receiving satellite, on receipt of the magnetic field deviation (delta-magfield) and covariance estimates from another satellite, the quality and relevance of those estimates are assessed relative to the receiving satellite's near-future trajectory. Based on the quality/relevance assessment, the estimates can be de-weighted. For example, deviation estimates can be de-weighted based on the following considerations, among any others:

- the age of the estimate (i.e., the older estimate, the greater the de-weighting);
- the distance of the Earth-Fixed point-of-data-collection from the Earth-Fixed point at which the correction to the local model would be made (i.e., the greater the distance, the greater the de-weighting);
- quality per their provided covariance (i.e., the greater the covariance, the greater the de-weighting);
- knowledge of heightened temporal variance of the magnetic field in a region (i.e., the greater the temporal variance, the greater the de-weighting).

In task S706, the satellite incorporates the measurements of task S705, as appropriate, into its local model. This may be done by subtracting the estimated and weighted time/position series of magnetic-field deviations from the current local best estimate of the magnetic field along the upcoming trajectory of the receiving satellite. In the case where these deviation estimates are being received from multiple contemporary satellites, the local satellite may combine the estimates by using a weighted, linear, 2-dimension regression mapped to the surface of the spheroid on which the orbit would lie.

Finally, in task S707, following the improvements to the local model as implemented through tasks S701 through S706, locally-observed deviations are broadcast in accordance with this process, accompanied by the parameterization of the local-model adjustments (versus the baseline reference model) against which the measurements are considered "deviations." In this way, the local models among the satellites need not be synchronized perfectly, nor agreed upon at any given point, for the broadcasted deviations to be effectively used.

The methods depicted in FIGS. 5, 6, and 7 may be performed by processing logic that may comprise hardware (circuitry, dedicated logic, etc.), software (such as is run on a general-purpose computer system or a dedicated machine), or a combination of both. In some embodiments, some of the blocks depicted in FIGS. 5, 6, and 7 might be performed concurrently, or in a different order than that depicted. Additionally, some processing might be performed by ground-based processors.

FIG. 8 depicts a block diagram of an illustrative data processing system 800 operating in accordance with aspects and implementations of the present disclosure. Data processing system 800 may implemented in any form factor, and includes processor 802, main memory 804, storage device 806, and input/output (I/O) device 808, interconnected as shown (e.g., via one or more busses, etc.).

Processor 802 represents one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is capable of executing instructions stored in main memory 804 and storage device 806, including instructions corresponding to the methods depicted in FIGS. 5, 6, and 7 above; of reading data from and writing data into main memory 804 and storage device 806; and of receiving input signals and transmitting output signals to input/output device 808. While a single processor is depicted in FIG. 8 for simplicity, data processing system 800 might comprise a plurality of processors.

Main memory 804 is capable of storing executable instructions and data, including instructions and data corresponding to the methods of FIGS. 5, 6, and 7 above, and may include volatile memory devices (e.g., random access memory [RAM]), non-volatile memory devices (e.g., flash memory), and/or other types of memory devices.

Storage device 806 is capable of persistent storage of executable instructions and data, including instructions and data corresponding to the method of FIGS. 5, 6, and 7 above, and may include a magnetic hard disk, a Universal Serial Bus (USB) solid state drive, a Redundant Array of Independent Disks (RAID) system, a network attached storage (NAS) array, etc. While a single storage device is depicted in FIG. 8 for simplicity, data processing system 800 might comprise a plurality of storage devices.

I/O device 808 receives input signals, such as from other satellites, forwards corresponding signals to processor 802, receives signals from processor 802, and emits corresponding output signals that can be used to control devices, such as the magnetorquers. In some embodiments, the I/O device might not be a part of data processing system 800 proper, but rather be associated with other subsystems of the satellite, or even ground-based systems. In some embodiments, the I/O device may establish a communications link between the satellite of interest and another satellite. In some embodiments, I/O device may establish a communications link between plural satellites (e.g., for data to be transmitted from a source to the satellite of interest). In some embodiments, a communications link can be relayed or established through ground equipment, and/or some of the processing related to the communications link can be performed at a ground station. In the illustrative embodiment, the input mechanism of I/O device 808 is a transceiver. While a single I/O device is depicted in FIG. 8 for simplicity, data processing system 800 might comprise a plurality of I/O devices.

Definitions. The following terms are defined for use herein and the appended

Magnetorquer. A magnetorquer is a solenoid device that produces a magnetic field, generating a torque in the presence of an external magnetic field. Form factors include, without limitation, solid-core magnetorquers and air-coil magnetorquers.

What is claimed:

1. A method for controlling a first satellite using magnetics alone, the method comprising:
   a) assessing a current attitude of the first satellite at a current time and at a current location using magnetometry;
   b) setting a desired attitude for the first satellite at a future time in a future location;
   c) developing, based on a model of the Earth's magnetic field that provides a state of the Earth's magnetic field at each potential waypoint, a set of waypoints for the first satellite at plural locations between the current location and the future location of the first satellite; and
   d) actuating a plurality of magnetorquers to induce torques that minimize the difference between the current attitude of the first satellite and an attitude of the first satellite at each to the set of waypoints to achieve the desired attitude of the first satellite at the future location, and wherein the magnetorquers are the sole means of inducing rotation of the first satellite to attain the desired attitude.

2. The method of claim 1 wherein developing comprises:
a) estimating a progression of position of the first satellite in an orbit thereof, the progression defining the set of waypoints;
b) calculating the state of the Earth's magnetic field at each waypoint; and
c) defining an orientation trajectory that specifies intermediate orientations for the first satellite that are achievable, via magnetic-induced rotation alone, such that the desired attitude is achieved at the future time.

3. The method of claim 2 wherein calculating the state of the Earth's magnetic field comprises:
receiving data obtained from additional satellites having a same orbital plane as the first satellite, and that are advanced in the orbit relative to the first satellite.

4. The method of claim 3 wherein the data is 3-axis magnetometer data.

5. The method of claim 4 comprising estimating, for each additional satellite from which data is obtained, a current attitude of each of said additional satellites based on the data, and a covariance of the estimated current attitude of each said additional satellite.

6. The method of claim 5 comprising assessing a deviation of the magnetometer data from a model of the magnetic field of the Earth, at a time and location at which the magnetometer data is collected.

7. The method of claim 6 comprising broadcasting the deviation from the model of the magnetic field.

8. The method of claim 7 comprising assessing a relevance of the broadcasted deviation to a near-future trajectory of the first satellite.

9. The method of claim 8 comprising incorporating, at the first satellite, the magnetometer data into the first satellite's model of the magnetic field, taking into consideration the assessed relevance.

10. The method of claim 1 wherein developing comprises:
developing, based on the model of the Earth's magnetic field that provides a state of the Earth's magnetic field at each potential waypoint and an ability to use the plurality of magnetorquers to attain the attitude at each of the plural locations, the set of waypoints for the first satellite that provide the attitude of the first satellite at the plural locations between the current location and the future location of the first satellite.

11. The method of claim 1 wherein developing comprises:
calculating, based on a model of the Earth's magnetic field that provides a state of the Earth's magnetic field at each potential waypoint, a set of waypoints for the first satellite at plural locations between the current location and the future location of the first satellite.

12. The method of claim 1 wherein actuating comprises:
actuating the plurality of magnetorquers to induce torques, during a time period beginning with the current time and ending at the future time when the desired attitude is attained, that minimize the difference between the current attitude of the first satellite and an attitude of the first satellite at each waypoint to achieve the desired attitude of the first satellite at the future location, and wherein the magnetorquers are the sole means of inducing rotation of the first satellite to attain the desired attitude.

13. An apparatus comprising a control system for a satellite, wherein the control system uses magnetics only to control an attitude of the satellite, wherein the control system comprises:
actuators that actuate a plurality of magnetorquers;
memory that stores 3-axis magnetometer data and data based thereon;
a processor, wherein the processor:
(a) develops, based on a model of the Earth's magnetic field that provides a state of the Earth's magnetic field at each potential waypoint and an ability to use the plurality of magnetorquers to attain an attitude of the satellite at each of plural locations, a set of waypoints for the satellite, wherein the set of waypoints provide the attitude of the satellite at each of the plural locations between the current location at a current time and a future location at a future time; and
(b) sends signals that cause the actuators to actuate the plurality of magnetorquers to induce torques during a time period beginning with the current time and ending at the future time when desired attitude is attained at the future location, wherein the magnetorquers are the sole means of inducing rotation of the satellite to attain the desired attitude.

14. The apparatus of claim 13 wherein the induced torques minimize the difference between a current attitude of the satellite and the attitude of the satellite at each waypoint to achieve the desired attitude of the satellite at the future location.

15. The apparatus of claim 13 wherein the apparatus is a satellite.

16. The apparatus of claim 13 wherein the 3-axis magnetometer data and the data based thereon is received from other satellites in an orbital plane of the satellite.

17. The apparatus of claim 16 wherein the processor further uses the 3-axis magnetometer data and the data based thereon to modify the model of the Earth's magnetic field on which the waypoints are based.

* * * * *